United States Patent
Li et al.

(10) Patent No.: US 11,860,732 B2
(45) Date of Patent: Jan. 2, 2024

(54) REDUNDANCY METADATA MEDIA MANAGEMENT AT A MEMORY SUB-SYSTEM

(71) Applicant: MICRON TECHNOLOGY, INC., Boise, ID (US)

(72) Inventors: Juane Li, Milpitas, CA (US); Fangfang Zhu, San Jose, CA (US); Seungjune Jeon, Santa Clara, CA (US); Yueh-Hung Chen, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 17/459,846

(22) Filed: Aug. 27, 2021

(65) Prior Publication Data

US 2023/0066863 A1 Mar. 2, 2023

(51) Int. Cl.
| | |
|---|---|
| *G11C 29/00* | (2006.01) |
| *G06F 11/10* | (2006.01) |
| *G06F 11/30* | (2006.01) |
| *G06F 12/02* | (2006.01) |
| *G06F 3/06* | (2006.01) |

(52) U.S. Cl.
CPC ........ *G06F 11/1068* (2013.01); *G06F 3/0619* (2013.01); *G06F 3/0659* (2013.01); *G06F 3/0679* (2013.01); *G06F 11/3037* (2013.01); *G06F 12/0238* (2013.01); *G06F 2212/7201* (2013.01)

(58) Field of Classification Search
CPC ............ G06F 11/1068; G06F 11/3037; G06F 12/0238; G06F 3/0658; G06F 3/0679; G06F 3/0619; G06F 2212/7201
See application file for complete search history.

(56) References Cited

U.S. PATENT DOCUMENTS

| | | | |
|---|---|---|---|
| 2015/0067245 A1* | 3/2015 | Kruger | G06F 3/0653 |
| | | | 711/103 |
| 2018/0219561 A1* | 8/2018 | Litsyn | H03M 13/2915 |

* cited by examiner

*Primary Examiner* — Samir W Rizk
(74) *Attorney, Agent, or Firm* — Lowenstein Sandler LLP

(57) ABSTRACT

A request is received to program host data to a memory device of a memory sub-system. The host data is associated with a logical address. A redundancy factor that corresponds to the logical address associated with the host data is obtained. A first physical address associated with a first set of cells of the memory device and a second physical address associated with a second set of cells of the memory device are determined based on the redundancy factor. The first set of memory cells is to store the host data and the second set of memory cells is to store redundancy metadata associated with the host data. The host data is programmed to the first set of memory cells. The redundancy metadata associated with the host data is programmed to the second set of memory cells.

20 Claims, 10 Drawing Sheets

| LOGICAL-TO-PHYSICAL DATA STRUCTURE 322 | | |
|---|---|---|
| VIRTUAL SMU 412 | PHYSICAL SMU 414 | RED. FACTOR 416 |
|  |  |  |
|  |  |  |

FIG. 4

REDUNDANCY METADATA MEDIA MANAGEMENT AT A MEMORY SUB-SYSTEM

TECHNICAL FIELD

Embodiments of the disclosure relate generally to memory sub-systems, and more specifically, relate to redundancy metadata media management at a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates an example logical-to-physical data structure, in accordance with some embodiments of the present disclosure.

DETAILED DESCRIPTION

Figure 1:
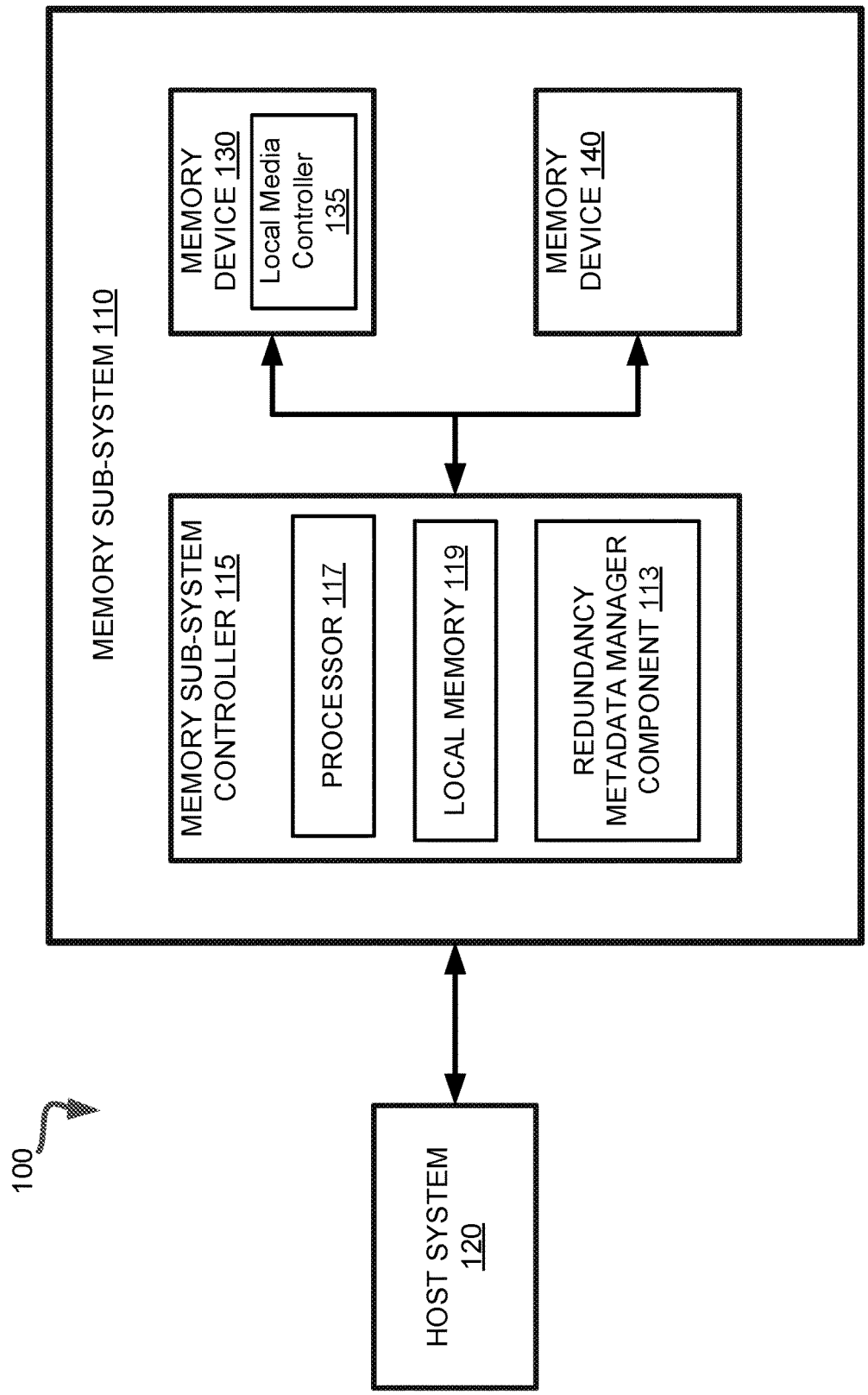
FIG. 1 illustrates an example computing system that includes a memory sub-system, in accordance with some embodiments of the present disclosure.

Aspects of the present disclosure are directed to redundancy metadata media management at a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information. Some types of memory, such as 3D cross-point, can group pages across dice and channels to form management units (MUs) (also referred to as logical units (LUNs)). A MU can correspond to a page, a block, etc. In some instances, a group of MUs that are grouped together for management purposes can be referred to as a super MU (SMU).

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell may be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data.

As described above, a die can contain one or more planes. A memory sub-system can use a striping scheme to treat various sets of data as units when performing data operations (e.g., write, read, erase, etc.). A die stripe refers to a collection of planes that are treated as one unit when writing, reading, or erasing data. A controller of a memory device (i.e., a memory sub-system controller, a memory device controller, etc.) can execute the same operation can carry out the same operation, in parallel, at each plane of a dice stripe. A block stripe is a collection of blocks, at least one from each plane of a die stripe, that are treated as a unit. The blocks in a block stripe can be associated with the same block identifier (e.g., block number) at each respective plane. A page stripe is a set of pages having the same page identifier (e.g., the same page number), across a block stripe, and treated as a unit. A MU stripe is a collection of MUs, at least one from each plane of a die stripe, a block stripe, a page stripe, etc., that are treated as a unit. A super management unit (SMU) refers to a collection or group of MUs that are grouped together for memory management purposes.

A host system can initiate a memory access operation (e.g., a programming operation, a read operation, an erase operation, etc.) on a memory sub-system. For example, the host system can transmit a request to a memory sub-system controller, to program data to and/or read data from a memory device of the memory sub-system. Such data is referred to herein as "host data." The memory sub-system controller can execute one or more operations to access the host data in accordance with request. As data is accessed at a memory cell of a memory device, the memory cell can deteriorate and eventually become defective. For example, when a host system initiates too many memory access operations for host data stored at a memory device, the memory cells that store the host data, as well as the adjacent memory cells at the memory device, can become corrupted. In some instances, a memory access operation (e.g., a read operation, etc.) performed by a memory sub-system controller to access data at one or more memory pages at each plane of a memory device can fail. Such failure is referred to herein as a multi-plane memory access failure.

A memory sub-system can support a redundancy mechanism to protect host data against a memory access failure. For example, the memory sub-system can implement one or more redundancy operations (e.g., redundant array of independent NAND (RAIN) operations) to provide redundancy for the data stored on the memory sub-system. When host data is received from the host system to be programmed to a memory device of the memory sub-system, a memory sub-system controller can generate redundancy metadata (e.g., parity data) based on an exclusive-or (XOR) operation with the received host data and can use the redundancy metadata to reconstruct or recalculate the host data in the event of a failure of a portion of the memory device that is storing host data. As an example, the memory sub-system controller can generate the redundancy metadata based on an XOR operation applied to host data stored at a particular number of data locations of a management unit (e.g., a page, a block) of the memory sub-system. If a portion of a memory device storing the host data fails and the corresponding data is lost or corrupted, the memory sub-system controller can reconstruct the lost/corrupted data based on an XOR operation among the rest of the host data and the redundancy metadata.

A portion of memory at a memory sub-system can be reserved to store redundancy metadata generated for host data that is stored at other portions of memory at the memory sub-system. For example, a memory sub-system controller can allocate one or more MUs of an MU stripe to store redundancy metadata generated for host data programmed to other MUs of the MU stripe. For purposes of explanation, the one or more allocated MUs are referred to herein as redundancy MUs and the other MUs of the MU stripe are referred to as host data MUs. As host systems and memory sub-systems become more advanced and complex, the overall storage capacity of a memory sub-system can be significantly large and/or the size of a unit of data that is accessible to a host system can be significantly small. For example, in some instances, an overall storage capacity of a memory sub-system can include several terabytes (TB) of memory space and a size of a unit of data that is accessible to the host system can correspond to tens of bytes of memory space. As indicated above, a host system can initiate a memory access operation (e.g., a programming operation, etc.) with respect to one unit of host data (e.g., corresponding to tens of bytes of memory space). In some instances, multiple units of host data can be stored at multiple respective host data MUs of a MU stripe.

The host system can transmit requests to access a respective unit of host data at different time periods. For example, the host system can transmit a first request to program a first unit of host data at a first time period and a second request to program a second unit of host data at a second time period. Responsive to receiving the first request, the memory sub-system controller can generate redundancy metadata associated with the first host data and store the generated redundancy metadata at a redundancy MU of a respective MU stripe. Responsive to receiving the second request, the memory sub-system controller can generate updated redundancy metadata associated with the first host data and the second host data and store the updated redundancy metadata at the redundancy MU. The memory sub-system controller can continue to generate updated redundancy metadata and store updated redundancy metadata at the redundancy MU until each host data MU of the MU stripe stores host data (i.e., the MU stripe is "closed").

In conventional systems, one or more redundancy MUs for each MU stripe can reside at a particular memory device of the memory sub-system. Accordingly, the memory sub-system controller can program redundancy metadata and updated redundancy metadata to the one or more redundancy MUs multiple times before a respective MU stripe is closed. Additionally, as host data is removed from respective host data MUs and/or new host data is programmed to the respective host data MUs, the memory sub-system controller can update and reprogram the redundancy metadata associated with the MU stripe at the one or more redundancy MUs after the MU stripe is closed. As multiple programming operations are performed at the one or more redundancy MUs residing on the particular memory device, the memory cells associated with the redundancy MUs can degrade at a faster rate than memory cells residing at other devices (i.e., that are not allocated to store redundancy metadata). As the memory cells associated with the redundancy MUs degrade, a significant number of memory access errors can occur, causing an overall error rate associated with the memory sub-system to increase. The memory sub-system controller can execute error correction operations to address the significant number of memory access errors, which can consume a significant amount of computing resources (e.g., processor cycles, etc.). Consuming a significant amount of computing resources can cause an overall system latency to increase and an overall system efficiency to decrease. In addition, over time, the memory cells associated with the redundancy MUs can degrade to a point at which data stored at the memory cells is not reliable and cannot be recovered (e.g., via an error correction operation). As the redundancy MUs are allocated to store redundancy metadata generated for host data stored that the memory sub-system, if the redundancy metadata stored at the redundancy MUs is inaccessible, the host data can become unrecoverable in the event of a catastrophic memory failure.

Aspects of the present disclosure address the above and other deficiencies by providing a scheme for redundancy metadata media management at a memory sub-system. One example of media management is wear leveling. In accordance with embodiments described herein, wear leveling refers to a technique for evenly distributing data (e.g., redundancy metadata) across a memory sub-system to avoid the concentration of memory cell wear at a particular portion (e.g., a particular memory device, a particular portion of a memory device, etc.) of the memory sub-system. Other media management operations are possible. In some embodiments, a memory sub-system controller can receive a request to program host data to a memory device of a memory sub-system. The host data can be associated with a logical address (e.g., indicated by the received request). The memory sub-system controller can obtain a redundancy factor that corresponds to the logical address associated with the host data. The redundancy factor can be a randomly generated number between zero and a number of super management units (SMUs) associated with the memory sub-system. In some embodiments, the memory sub-system can include multiple fault tolerant stripes across multiple memory devices of the memory sub-system. A fault tolerant stripe refers to a collection of management units (MUs) (e.g., blocks, pages, etc.) at particular regions (e.g., planes) of two or more memory devices that store data that can be recovered by the same one or more data recovery operations executed by the memory sub-system controller. In some embodiments, multiple fault tolerant stripes can span a super management unit (SMU) associated with the memory sub-system. The memory sub-system controller can associate the redundancy factor with each MU of a respective fault tolerant stripe.

In some embodiments, the memory sub-system controller can obtain the redundancy factor using a logical-to-physical (L2P) data structure associated with the memory sub-system. For example, the memory sub-system controller can determine an address associated with a virtual SMU (vSMU) associated with the host data based on the logical address for the host data. The memory sub-system controller can identify an entry of the L2P data structure that corresponds to the determined vSMU and obtain the redundancy factor from the identified entry.

The memory sub-system controller can determine a physical address associated with a first set of memory cells of the memory device that is to store the host data and a physical address associated with a second set of memory cells of the memory device that is to store redundancy metadata associated with the host data based on the redundancy factor. In some embodiments, the memory sub-system controller can determine a virtual fault tolerant stripe associated with the host data and a virtual management unit (vMU) associated with the virtual fault tolerant stripe based on the logical address. The memory sub-system controller can provide an indication of the virtual fault tolerant stripe and the redundancy factor as input to a first function and an indication of the vMU and the redundancy factor as input to a second function. The memory sub-system controller can obtain one or more outputs of the first and second functions, which can include an indication of an index associated with the physical fault tolerant stripe that is to store the host data of the request and an indication of an index associated with a physical MU of the physical fault tolerant stripe that is to store the host data. The memory sub-system controller can determine a physical address associated with the first set of memory cells that is to store the host data of the request based on the index associated with the physical fault tolerant stripe and the index associated with the physical MU of the physical fault tolerant stripe. In some embodiments, the memory sub-system controller can determine the physical address associated with the second set of memory cells that is to store the redundancy metadata based on the redundancy factor, the index associated with the virtual fault tolerant stripe (i.e., provided as input to the first function), a number of MUs associated with the physical fault tolerant stripe (i.e., obtained as an output from the first function), a number of memory devices associated with the memory sub-system, and a number of partitions associated with each memory device of the memory sub-system.

The memory sub-system controller can program the host data to the first set of memory cells responsive to determining the physical address associated with the first set of memory cells. The memory sub-system controller can program redundancy metadata associated with the host data to the second set of memory cells responsive to determining the physical address associated with the second set of memory cells. After the host data and the redundancy metadata is programmed to the first set of memory cells and the second set of memory cells, respectively, the memory sub-system controller can receive another request to program other host data to a memory device of the memory sub-system. The memory sub-system controller can obtain a redundancy factor associated with the other host data based on a logical address associated with the other host data, as described above. If the obtained redundancy factor corresponds to the redundancy factor associated with the host data of the previous request, the memory sub-system controller can determine that redundancy metadata associated with the other host data is to be stored at the second set of memory cells, in accordance with previously described embodiments. If the obtained redundancy factor corresponds to a different redundancy factor than the redundancy factor associated with the host data of the previous request, the memory sub-system controller can determine that the redundancy metadata associated with the host data is to be stored at another set of memory cells (e.g., a third set of memory cells) of another memory device or another portion of a memory device of the memory sub-system.

Advantages of the present disclosure include, but are not limited to, providing a scheme that distributes redundancy data across a memory sub-system. As indicated above, embodiments of the present disclosure provide that a memory sub-system can generate and maintain a redundancy factor for each fault tolerant stripe (e.g., a fault tolerant stripe) associated with the memory sub-system. The memory sub-system controller can obtain the redundancy factor based on a logical address associated with host data and determine the physical address associated with the portion of memory that is to store the host data and the physical address associated with the portion of memory that is to store redundancy metadata for the host data based on the redundancy factor. As the redundancy factor corresponds to a randomly generated number between zero and the number of SMUs associated with the memory sub-system, the set of MUs of each fault tolerant stripe that are allocated to store redundancy metadata can reside at a different memory device, or a different portion of a memory device, than MUs at other fault tolerant stripe that are allocated to store redundancy metadata. Accordingly, redundancy metadata can be stored across multiple memory devices, or multiple portions of a memory device, for a memory sub-system, which reduces the concentration of programming operations at a single memory device, or a single portion of a memory device. As a result, a fewer number of memory access errors can occur at the memory sub-system and the memory sub-system controller can execute fewer error correction operations. As fewer error correction operations are executed, fewer computing resources (e.g., processing cycles, etc.) are consumed to perform error correction and such computing resources can be made available to perform other processes associated with the memory sub-system. As additional computing resources are made available for other processes, an overall latency of the memory sub-system decreases and an overall efficiency of the memory sub-system increases. In addition, the fewer number of errors occur at the portions of memory that store redundancy metadata, a likelihood that the redundancy metadata is accessible is significantly higher, which increases the likelihood that host data can be recovered in the event of a catastrophic memory failure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a redundancy metadata manager component 113 (referred to as redundancy metadata manager 113) that can manage redundancy data generated for host data stored at one or more portions of a memory device 130, 140. In some embodiments, the memory sub-system controller 115 includes at least a portion of the redundancy metadata manager component 113. For example, the memory sub-system controller 115 can include a processor 117 (processing device) configured to execute instructions stored in local memory 119 for performing the operations described herein. In some embodiments, the redundancy metadata manager component 113 is part of the host system 120, an application, or an operating system.

Redundancy metadata manager 113 can be configured to implement a scheme for redundancy metadata media management at memory sub-system 110. In some embodiments, host system 120 can transmit a request to memory sub-system 110 to program host data to a memory device 130, 140. Redundancy metadata manager 113 can obtain a redundancy factor that correspond to a logical address associated with the host data. In some embodiments, redundancy metadata manager 113 can obtain the redundancy factor by determining a virtual super management unit (vSMU) associated with the host data based on the logical address and identifying an entry of a logical-to-physical (L2P) data structure that corresponds to the determined vSMU. Redundancy metadata manager 113 can extract the redundancy factor from the identified entry. If the identified entry does not include an indication of the redundancy factor, redundancy metadata manager 113 can generate the redundancy metadata factor.

Redundancy metadata manager 113 can determine a first physical address associated with a first set of memory cells of a memory device 130, 140 that is to store the host data based on the obtained redundancy factor. Redundancy metadata manager 113 can also determine a second physical address associated with a second set of memory cells of a memory device 130, 140 that is to store the redundancy metadata based on the obtained redundancy factor. Further details regarding determining the first physical address and the second physical address are provided herein. Responsive to determining the first physical address and the second physical address, redundancy metadata manager 113 can program the host data to the first set of memory cells and the redundancy metadata associated with the host data to the second set of memory cells.

In some embodiments, redundancy metadata manager 113 can receive another request to program additional host data to a memory device 130, 140. Redundancy metadata manager 113 can determine the redundancy factor associated with the additional host data based on a logical address associated with the additional host data, and can use the determined redundancy factor to determine physical addresses associated with a set of memory cells that is to store the additional host data and another set of memory cells that is to store redundancy metadata associated with the additional host data, as described above. If the redundancy factor obtained for the additional host data corresponds to the redundancy factor obtained for the host data programmed to the first set of memory cells, the determined physical address for the set of memory cells that is to store the redundancy metadata associated with the additional host data can correspond to the second physical address. If the redundancy factor obtained for the additional host data does not correspond to the redundancy factor obtained for the host data programmed to the first set of memory cells, the determined physical address can correspond to an address associated with another set of memory cells (e.g., a third set of memory cells) of a memory device 130, 140. In some embodiments, the third set of memory cells can reside at a different memory device 130, 140 from the second set of memory cells (i.e., that stores the redundancy metadata associated with the host data stored at the first set of memory cells). Further details regarding the redundancy metadata manager 113 are provided herein.

Figure 2:
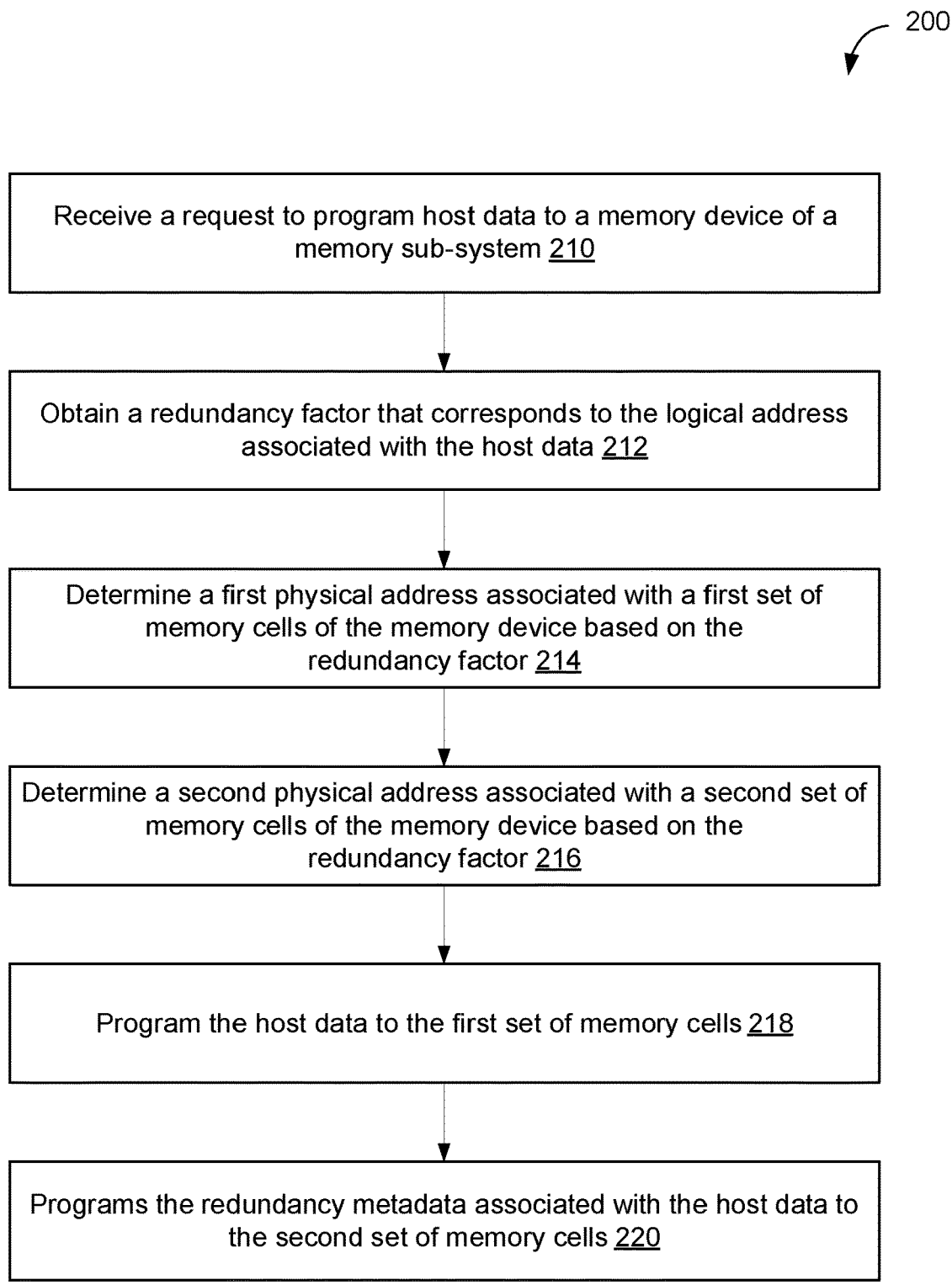
FIG. 2 is a flow diagram of an example method for redundancy metadata media management at a memory sub-system, in accordance with some embodiments of the present disclosure.

FIG. 2 is a flow diagram of an example method 200 for redundancy metadata media management at a memory sub-system, in accordance with embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the redundancy metadata manager component 113 of FIG. 1. In other or similar embodiments, one or more operations of method 200 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3A:
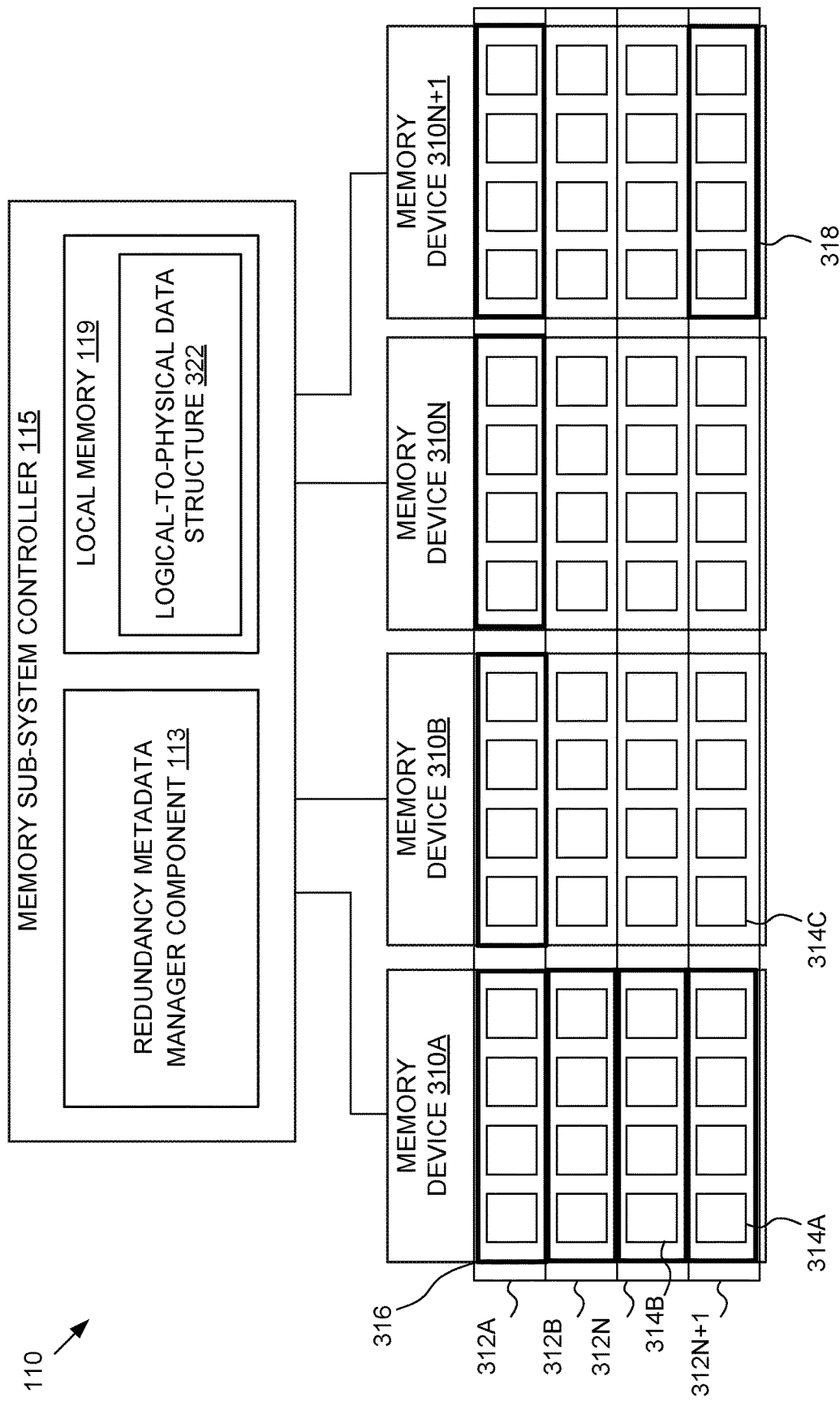
FIGS. 3A-3D depict an example of redundancy metadata media management at a memory sub-system, in accordance with some embodiments of the present disclosure.

At block 210, processing logic receives a request to program host data to a memory device of a memory sub-system. In some embodiments, the memory sub-system can correspond to memory sub-system 110 illustrated in FIG. 3A. As illustrated in FIG. 3A, multiple memory devices 310 can be connected to memory sub-system controller 115 of memory sub-system 110. One or more fault tolerant stripes 312 can be included across the multiple memory devices 310. As indicated above, a fault tolerant stripe refers to a collection of management units (MUs) (e.g., planes, blocks, pages, etc.) at particular portions of two or more memory devices 310 that store host data that is recoverable by memory sub-system controller 115. In some embodiments, each memory device 310 illustrated in FIG. 3A (e.g., memory device 310A, 310B, 310N, 310N+1) can correspond to a memory device 130, 140 described with respect to FIG. 1. It should be noted that although FIG. 3A depicts four memory devices 310 connected to memory sub-system controller 115, embodiments of the present disclosure can be directed to any number of memory devices (e.g., one memory device 310, two memory devices 310, four memory devices 310, eight memory devices 310, etc.) connected to any number of memory sub-system controllers 115 (e.g., one memory sub-system controller 115, two memory sub-system controllers 115, etc.). It should also be noted that although embodiments of the present disclosure may be directed to a fault tolerant stripe across multiple memory devices 310 connected to memory sub-system controller 115, embodiments of the present disclosure can be directed to a fault tolerant stripe across multiple portions of a single memory device 310.

As illustrated in FIG. 3A, multiple fault tolerant stripes 312 can reside across multiple memory devices 310. As described above, each memory device can include one or more MUs 314 (e.g., blocks, pages, etc.). A plane 316 at a respective memory device 310 can refer to a grouping of one or more MUs 314 residing at a particular region of memory device 310. In some embodiments, a memory device 310 can include at least two planes 316. For example, as illustrated in FIG. 3A, each memory device 310 connected to memory sub-system controller can include four planes 316 that each include a grouping of one or more MUs 314. It should be noted that although some embodiments of the disclosure are directed to memory devices 310 that include four planes 316, embodiments of the present disclosure can applied to memory devices that include any number of planes 316 (e.g., two planes 316, four planes 316, eight planes 316, etc.).

In some embodiments, each fault tolerant stripe 312 across memory devices 310 can be associated with a particular stripe identifier (ID) (e.g., a stripe index). For example, a first stripe 312A across memory devices 310 can be associated with a first stripe ID (e.g., a first stripe index) and, a second stripe 312B across memory devices 310 can be associated with a second stripe ID (e.g., a second stripe index), a nth stripe 312N across memory devices 310 can be associated with a nth stripe ID (e.g., a nth stripe index), and/or a (n+1)th stripe 312N+1 across memory devices 310 can be associated with a (n+1)th stripe ID (e.g., a (n+1)th stripe index). In some embodiments, each MU included in a respective stripe 312 can be associated with a particular MU ID (e.g., a MU index). For example, first stripe 312A can include a first set of MUs that are each associated with a MU ID (e.g., MU-0, MU-1, MU-2, etc.). Second stripe 312B can also include a second set of MUs 314 that are each associated with the MU IDs (e.g., MU-0, MU-1, MU-2, etc.). In some embodiments, a physical address associated with a set of memory cells of a memory device 310 can correspond to a stripe ID and a MU ID associated with the set of memory cells. For example, the physical address associated with a set of memory cells at MU 314A can correspond to a (n+1)th stripe index associated with stripe 312N+1 (e.g., S-N+1) and a MU index associated with MU 314A (e.g., MU-0, as MU 314A is depicted to be the first MU of stripe 312N+1). In another example, the physical address associated with a set of memory cells at MU 314B can correspond to a nth stripe index associated with stripe 312N (e.g., S-N) and a MU index associated with MU 314B (e.g., MU-0, as MU 314B is depicted to be the first MU if stripe 312B). In yet another example, the physical address associated with a set of memory cells at 314C can correspond to the (n+1)th stripe index and a MU index associated with MU 314C (e.g., MU-4).

As indicated above, a super management unit (SMU) refers to a collection or grouping of MUs 314 for the purpose of memory management. In some embodiments, a SMU can include MUs 314 associated with a fault tolerant stripe (e.g., stripe 312A). In other or similar embodiments, a SMU can include MUs 314 associated with two or more fault tolerant stripes 312. For example, in some embodiments, a SMU can include MUs 314 associated with a first fault tolerant stripe 312A and MUs 314 associated a second fault tolerant stripe 312B. In some embodiments, each SMU of memory sub-system 110 can be associated with a particular SMU ID (e.g., a SMU index, a SMU address, etc.), in accordance with previously described embodiments.

As indicated above, memory sub-system controller 115 can receive a request to program host data to a memory device 310 of memory sub-system 110. The host data can be associated with a logical address (e.g., a logical page address, a logical block address, etc.). The logical address can be included with the request to program the host data, in some embodiments. In some embodiments, the logical address can correspond to a virtual SMU, a virtual fault tolerant stripe, and/or a virtual MU. In some embodiments, redundancy metadata manager component 113 can determine an identifier and/or an address associated with the virtual SMU, the virtual fault tolerant stripe, and/or the virtual MU. Further details regarding determining the virtual SMU, the virtual fault tolerant stripe, and/or the virtual MU are provided below.

Referring back to FIG. 2, at block 212, processing logic obtains a redundancy factor that corresponds to the logical address associated with the host data. As indicated above, the redundancy factor can be a randomly generated number between zero and a number of SMUs associated with memory sub-system 110. In some embodiments, each MU 314 of a respective fault tolerant stripe 312 across memory devices 310 can be associated with the same redundancy factor.

In some embodiments, processing logic can obtain the redundancy factor using a logical-to-physical (L2P) data structure, such as L2P data structure 322 of FIG. 3A. As illustrated in FIG. 3A, L2P data structure 322 can be stored at local memory 119 of memory sub-system controller 115. In other or similar embodiments, L2P data structure 322 can be stored at another portion of memory sub-system 110 (e.g., at one or more portions of memory devices 310. In some embodiments, L2P data structure 322 can include one or more entries that are configured to store a mapping between an address or an identifier (e.g., an index) associated with a virtual SMU and an address or an identifier associated with a physical SMU (i.e., residing at one or more portions of memory devices 310). FIG. 4 depicts an example L2P data structure 322, in accordance with some embodiments of the present disclosure. As illustrated in FIG. 4, L2P data structure 322 can include one or more entries 410. Each entry can include a virtual SMU field 412 that is configured to store an indication of an address or an identifier associated with a virtual SMU. Each entry 410 can also include a physical SMU field 414 that is configured to store an indication of an address or identifier associated with a physical SMU (i.e., residing at a memory device 310).

In some embodiments, redundancy metadata manager 113 (or another component of memory sub-system 115) can generate a mapping between an address or identifier associated with a particular virtual SMU and an address or identifier associated with a particular physical SMU during an initialization of the memory sub-system 110. For example, during an initialization of memory sub-system 110, redundancy metadata manager 113 can determine an address associated with each physical SMU associated with memory sub-system 115 and can generate a mapping between the determined address and an identifier for a virtual SMU. Redundancy metadata manager 113 can store the generated mapping at data structure 322. In other or similar embodiments, redundancy metadata manager 113 (or another component of memory sub-system 115) can generate a mapping between an address or identifier associated with a particular virtual SMU and an address or identifier associated with a particular physical SMU during a runtime of the memory sub-system 110. For example, memory sub-system controller 115 can make MUs associated with a physical SMU available to store host data (i.e., open the SMU). Responsive to detecting that the SMU is open, redundancy metadata manager 113 can obtain an address or identifier associated with the SMU. Host system 120 can transmit a request to store host data to memory sub-system 110, as described above.

Redundancy metadata manger 113 can determine an address or an identifier associated with a virtual SMU based on a logical address associated with the host data. For example, redundancy metadata manager 113 can determine the address or identifier associated with the virtual SMU based on the logical address associated with the host data, which can be represented as LA, and a number a number of MUs included in a virtual SMU, which can be expressed as variable m. In some embodiments, redundancy metadata manager 113 can determine the value of m based on pre-configured or experimental data that is obtained by memory sub-system controller 115 before or during initialization of memory sub-system 110. For illustrative purposes, the address or identifier associated with the virtual SMU, which can be expressed as LSA, can be represented as LA/m. Responsive to determining the address or identifier associated with the virtual SMU, redundancy metadata manager 113 can generate a mapping between the address or identifier associated with the physical SMU and the address or identifier associated with the virtual SMU and can store an indication of the logical address at an entry 410 of data structure.

As illustrated in FIG. 4, each entry of data structure 322 can include a redundancy factor field 416. The redundancy factor field 416 is configured to store an indication of a redundancy factor associated with a respective virtual SMU and/or physical SMU. As indicated above, in some embodiments, redundancy metadata manager 113 can obtain a redundancy factor associated with a logical address for host data using data structure 322. In response to receiving a request to program host data, redundancy metadata manager 113 can determine an address or an identifier associated with a virtual SMU based on the logical address, as described above. Redundancy metadata manager 113 can identify an entry of data structure 322 that corresponds to the determined address or identifier and can determine whether the redundancy factor field 416 of the identified entry includes an indication of a redundancy factor. In response to determining that filed 416 does not include an indication of the redundancy factor, redundancy metadata manager 113 can generate the redundancy factor by selecting a random number between 0 and a number of SMUs associated with memory sub-system 110 (which can be expressed as nSMU). For illustrative purposes, the redundancy factor, which can be expressed as RF, can be represented as rand(nSMU), where rand( ) refers to a random number generation function. Responsive to generating the redundancy factor, redundancy metadata manager 113 can add an indication of the redundancy factor to the entry associated with the virtual SMU.

Referring to FIG. 2, at block 214, processing logic determines a first physical address associated with a first set of memory cells of the memory device based on the redundancy factor. In some embodiments, processing logic determines the first physical address based on an identifier or an address for a virtual fault tolerant stripe associated with the host data and/or an identifier or address for a virtual MU associated with the host data. Further details regarding determining the first physical address, the identifier or the address for the virtual fault tolerant stripe, and the identifier or the address for the virtual MU associated with the host data are provided in further detail with respect to FIG. 5.

At block 216, processing logic determines a second physical address associated with a second set of memory cells of the memory device based on the redundancy factor. In some embodiments, processing logic determines the second physical address based on an identifier or an address for the virtual fault tolerant stripe, a number of MUs 314 associated with the fault tolerant stripe, a number of memory devices 310 associated with the memory sub-system 110, and/or a number of partitions associated with each memory device 310 associated with memory sub-system 110.

Figure 5:
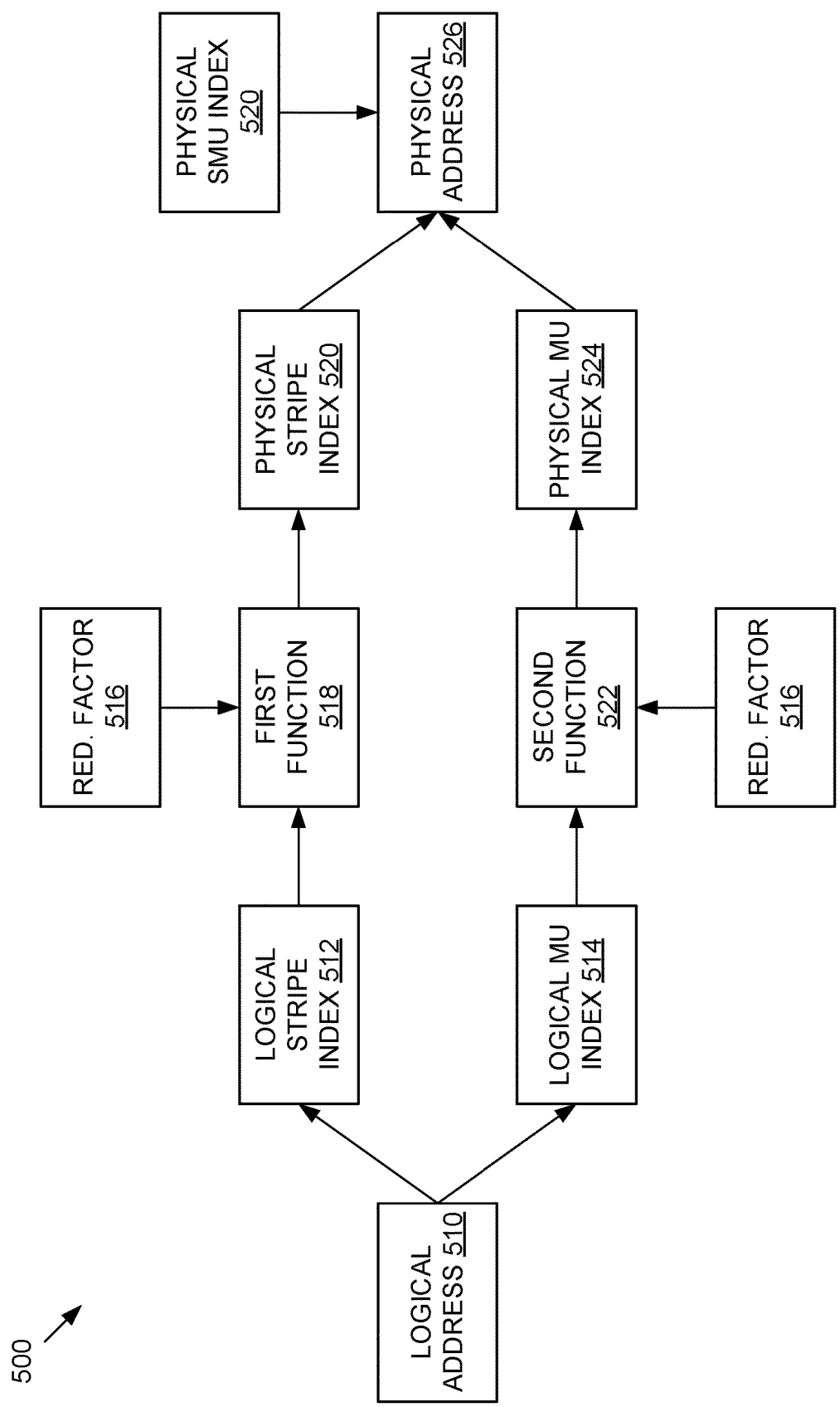
FIG. 5 illustrates an example logical address to physical address translation, in accordance with some embodiments of the present disclosure.

FIG. 5 illustrates an example logical address to physical address translation 500, in accordance with some embodiments of the present disclosure. As indicated above, host data of a request received by memory sub-system controller 115 can be associated with a logical address 510, which can be expressed as LA. In some embodiments, redundancy metadata manager 113 can determine an identifier or an address for a logical fault tolerant stripe (e.g., logical stripe index 512, and an identifier or an address for a logical MU (e.g., logical MU index 514), based on logical address 510. For illustrative purposes, logical stripe index 512 can be expressed as LSI and logical MU index 514 can be expressed as LMI. In some embodiments, LSI can be represented as (LA % m)/s, where m represents a number of MUs in a virtual SMU, as indicated above, and s represents a number of MUs in a virtual fault tolerant stripe. In some embodiments, redundancy metadata manager 113 can obtain the values of m and/or s from local memory 119 (e.g., one or more registers of local memory 119). Memory sub-system controller 115 can obtain the values of m and/or s based on pre-configured or experimental data before or during initialization of memory sub-system 110. In additional or alternative embodiments, LMI can be represented as (LA % m) % s.

In some embodiments, redundancy metadata manager 113 can provide logical stripe index 512 and a redundancy factor 516 determined for the host data of the request, as described above, as input to a first function 518. The first function 518 can be configured to determine an identifier or an address associated with a physical stripe 312 across memory devices 310 (i.e., physical stripe index 520) based on a given identifier or address for a virtual fault tolerant stripe and a given redundancy factor. Redundancy metadata manager 113 can obtain one or more outputs of first function 518 and can determine physical stripe index 520 based on the one or more obtained outputs. For illustrative purposes, physical stripe index 520 can be expressed as PSI and can be represented as (LSI+[RF/s]) % (m'/s'), where RF, represents the redundancy factor, m' represents a number of MUs in a physical SMU and s' represents a number of MUs in a physical stripe 312. Redundancy metadata manager 113 can obtain the values of m' and/or s' from local memory 119 (e.g., one or more registers of local memory 119). Memory sub-system controller 115 can obtain the values of m' and/or s' based on pre-configured or experimental data before or during initialization of memory sub-system 110, as described above.

In additional or alternative embodiments, redundancy metadata manager 113 can provide logical MU index 514 and redundancy factor 516 as input to a second function 522. The second function 522 can be configured to determine an identifier or an address associated with a physical MU 314 of a physical stripe 312 (i.e., physical MU index 524) based on a given identifier or address for a virtual MU and a given redundancy factor. Redundancy metadata manager 113 can obtain one or more outputs of second function 522 and can determine physical MU index 524 based on the one or more obtained outputs. For illustrative purposes, physical MU index 524 can be expressed as PMI and can be represented as (LMI+RMI+1)% s', wherein RMI represents an identifier or an address (e.g., an index) associated with a set of memory cells that is to store redundancy metadata associated with host data of the request. Further details regarding determining a value of RMI are provided below.

As indicated above, a physical address (e.g., physical address 526) associated with a set of memory cells of memory device 310 can correspond to an identifier or address for a fault tolerant stripe and an identifier or address for a MU associated with the set of memory cells. Accordingly, redundancy metadata manager 113 can determine physical address 526 based on physical stripe index 520 and physical MU index 524. Redundancy metadata manager 113 can further determine physical address 526 based on an identifier or address for a physical SMU associated with the set of memory cells (i.e., physical SMU index 520). In some embodiments, redundancy metadata manager 113 can determine the identifier or address for the physical SMU based on the physical SMU field 414 of an entry 410 of data structure 322 that corresponds to the virtual SMU associated with the host data, as described above. For illustrative purposes, physical SMU index 520 can be expressed as PSA, physical stripe index 520 can be expressed as PSI, and physical MU index can be expressed as PMI. Physical address 526 can be represented as (PSA*m')+(PSI*s')+PMI, where m' represents a number of MUs in a physical SMU and s' represents a number of MUs in a physical stripe 312.

As indicated above, redundancy metadata manager 113 can determine a physical address associated with a second set of memory cells that are to store redundancy metadata associated with the host data. In some embodiments, the physical address associated with the second set of memory cells can correspond to an index associated with the second set of memory cells, which can be expressed as RMI, as indicated above. For illustrative purposes, RMI can be expressed, in some embodiments, as:

$$\left\lfloor \frac{LSI + RF \; \% \; s}{d * p} \right\rfloor \% \; s'$$

where d represents a number of memory devices 310 (e.g., die) associated with memory sub-system 110 and p represents a number of partitions per memory device 310. Redundancy metadata manager 113 can obtain the identifier or the address for the virtual fault tolerant stripe (e.g., logical stripe index 512 or LSI) as described above. In some embodiments, redundancy metadata manager 113 can obtain the number of MUs 314 associated with the fault tolerant stripe (i.e., s), the number of memory devices 310 associated with the memory sub-system 110 (i.e., d), and/or the number of partitions associated with each memory device 310 associated with memory sub-system 110 (i.e., p) from local memory 119 (e.g., one or more registers of local memory 119). Memory sub-system controller 115 can obtain the number of MUs 314 associated with the fault tolerant stripe, the number of memory devices 310 associated with the memory sub-system 110, and/or the number of partitions associated with each memory device 310 associated with memory sub-system 110 based on pre-configured or experimental data before or during initialization of memory sub-system 110, as described above.

Referring back to FIG. 2, at block 218, processing logic programs the host data to the first set of memory cells. At block 220, processing logic programs the redundancy metadata associated with the host data to the second set of memory cells. In some embodiments, the host data of the request can be the first host data that is programmed to MUs 314 of a particular fault tolerant stripe 312. In such embodiments, the redundancy metadata associated with the host data can be a copy of the host data. Accordingly, processing logic can program a copy of the host data to the second set of memory cells associated. In other or similar embodiments, the host data is not the first host data that is programmed to MUs 314 of the particular fault tolerant stripe 312. In such embodiments, processing logic can generate the redundancy data associated with the host data based on the host data of the request and additional host data already residing on one or more MUs 314 of the particular fault tolerant stripe 312 and store the host data at the second set of memory cells, as described herein.

Figure 3B:
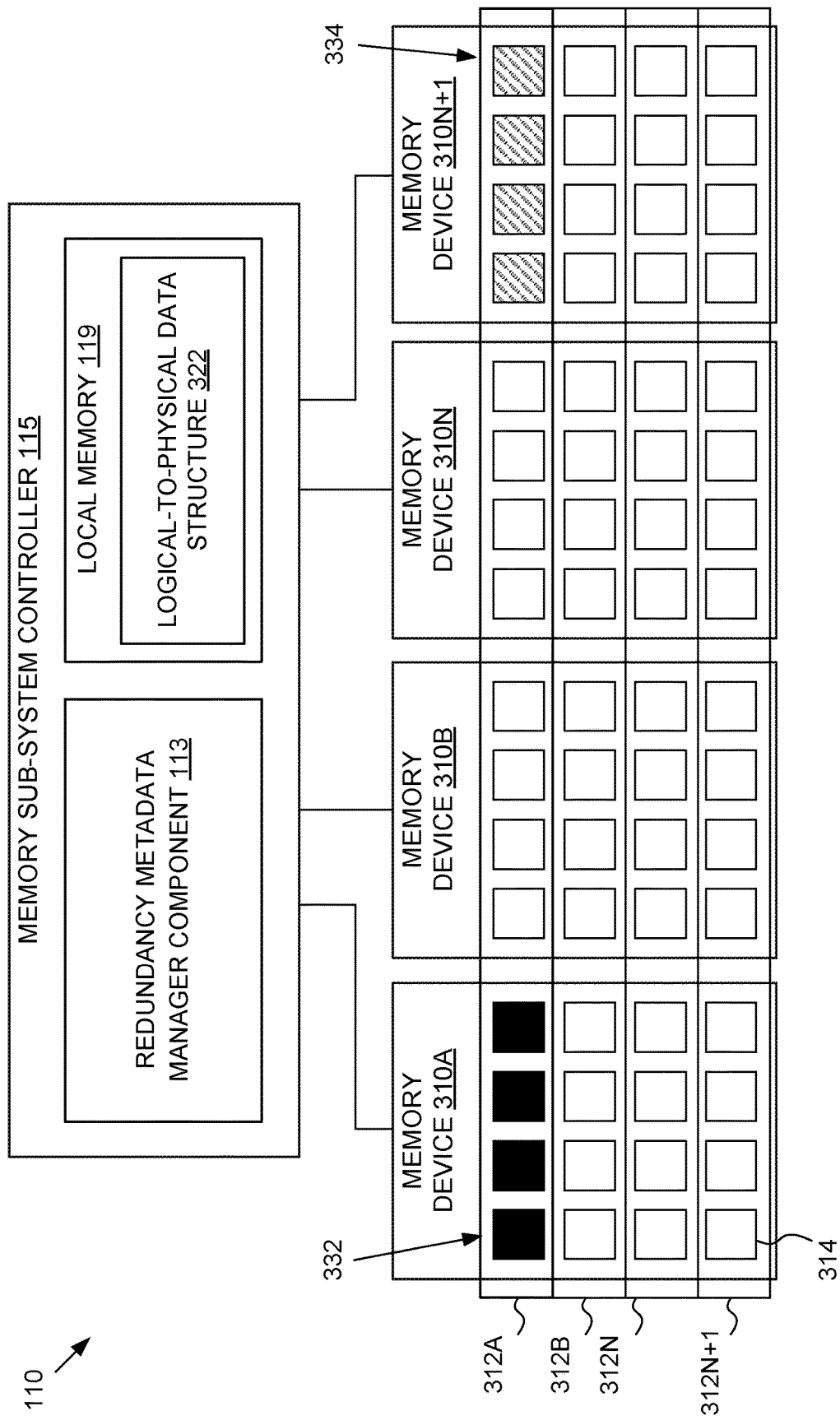

FIG. 3B depicts host data and redundancy metadata programmed to memory cells associated with a respective fault tolerant stripe 312 (e.g., stripe 312A), in accordance with some embodiments of the disclosure. As illustrated in FIG. 3B, host data of the request can be programmed to a first set of memory cells 332 corresponding to one or more first MUs of a first fault tolerant stripe 312A. As also illustrated in FIG. 3B, redundancy metadata associated with the host data can be programmed to a second set of memory cells 334 corresponding to one or more second MUs of the first fault tolerant stripe 312A. After the host data and redundancy metadata are programmed to memory sub-system 110, memory sub-system controller 115 can receive requests from host system 120 to program additional host data to a memory device 310 of memory sub-system 110. In some embodiments, the logical address associated with the additional host data can be associated with the same virtual SMU and/or virtual fault tolerant stripe as the logical address for the host data programmed to memory cells 332. Redundancy metadata manager 113 can determine, based on the logical address associated with the additional host data, that redundancy metadata associated with the additional host data is to be programmed to the second set of memory cells 334, in accordance with embodiments described herein. Redundancy metadata manager 113 can generate updated redundancy metadata associated with the host data associated with fault tolerant stripe 312A and program the updated redundancy metadata at the second set of memory cells 334, in accordance with embodiments provided below.

Figure 6:
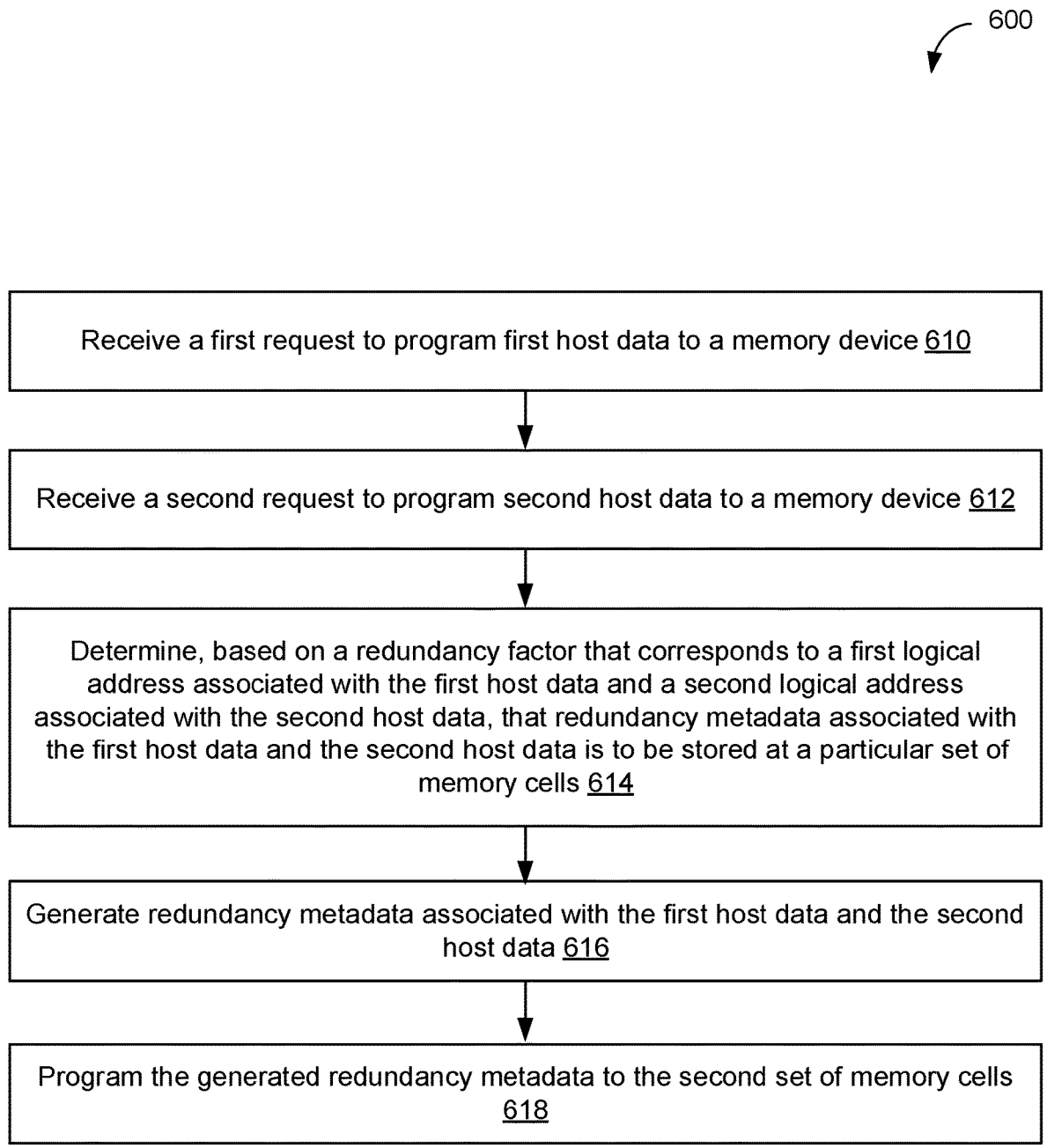
FIG. 6 is a flow diagram of another example method for redundancy metadata media management at a memory sub-system, in accordance with some embodiments of the present disclosure.

FIG. 6 is a flow diagram of another example method 600 for redundancy metadata media management at a memory sub-system, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the redundancy metadata manager component 113 of FIG. 1. In other or similar embodiments, one or more operations of method 600 is performed by another component of the memory sub-system controller, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 610, processing logic can receive a first request to program first host data to a memory device. At block 612, processing logic can receive a second request to program second host data to a memory device. Processing logic can receive the first and second requests in accordance with previously described embodiments. In some embodiments, the first host data can be associated with a first logical address (e.g., indicated in the first request) and the second host data can be associated with a second logical address (e.g., indicated in the second request). The first logical address can correspond to a first set of memory cells of a fault tolerant stripe (e.g., fault tolerant stripe 312) of a memory sub-system (e.g., memory sub-system 110). The second logical address can correspond to a second set of memory cells of the fault tolerant stripe.

In some embodiments, processing logic can receive the first request and determine a physical address associated with the first set of memory cells based on the first logical address, in accordance with embodiments described with respect to FIG. 2. Processing logic can also determine a physical address of a third set of memory cells that is to store redundancy metadata associated with the first host data based on the first logical address, as described with respect to FIG. 2. Responsive to determining the physical address associated with the first set of memory cells and the physical address associated with the third set of memory cells, processing logic can program the first host data to the first set of memory cells and redundancy metadata associated with the first host data to the third set of memory cells, as described above. In some embodiments, processing logic can program the first host data and the redundancy metadata associated with the first host data before the second request to program the second host data is received.

At block 614, processing logic can determine, based on a redundancy factor that corresponds to the first logical address associated with the first host data and the second logical address associated with the second host data, that redundancy metadata associated with the first host data and the second host data is to be stored at a particular set of memory cells. In some embodiments, processing logic can obtain a redundancy factor that corresponds to the second logical address. For example, processing logic can determine a vSMU associated with the second host data, in accordance with previously described embodiments. As indicated above, the second logical address can correspond to the same fault tolerant stripe 312 that stores the first host data and the redundancy metadata associated with the first host data. Accordingly, the vSMU associated with the second host data can correspond to the vSMU associated with the first host data. Processing logic can identify an entry 410 of data structure 322 that corresponds to the vSMU associated with the second host data, in accordance with previously described embodiments and can extract, from the identified entry 410, an indication of the redundancy factor associated with the second host data. As the vSMU associated with the second host data corresponds to the vSMU associated with the first host data, the redundancy factor associated with the second host data can be the redundancy factor associated with the first host data.

Processing logic can determine a physical address associated with the second set of memory cells (i.e., the memory cells to store the second host data) based on the redundancy factor, in accordance with previously described embodiments. For example, processing logic can determine a logical stripe index 512 and a logical MU index 512 associated with the second host data, as described above. Processing logic can provide the logical stripe index 512 and the redundancy factor (e.g., redundancy factor 516) as input to first function 518 and can determine physical stripe index 520 associated with the second set of memory cells based on one or more outputs of first function 518. Processing logic can provide the logical MU index 512 and redundancy factor 516 as input to second function 522 and can determine physical MU index 524 associated with the second set of memory cells based on one or more outputs of second function 522. Processing logic can determine the physical address 526 associated with the second set of memory cells based on physical stripe index 520, physical MU index 524, and physical SMU index 520 (i.e., obtained from the identified entry 410 of data structure 522), in accordance with previously described embodiments. Processing logic can program the second host data to the second set of memory cells, in accordance with previously described embodiments.

Processing logic can also determine the physical address associated with the third set of memory cells (i.e., the memory cells to store redundancy metadata associated with the second host data) based on the redundancy factor, an identifier or an address for a virtual fault tolerant stripe associated with the second host data, a number of MUs associated with the fault tolerant stripe, a number of memory devices 310 associated with memory sub-system 110, and/or a number of partitions associated with each memory device 310 associated with memory sub-system 110, as described above. As indicated above, the redundancy factor associated with the second host data can be the redundancy factor associated with the first host data. In addition, the identifier or the address for the virtual fault tolerant stripe associated with the second host data can be the identifier or the address for the virtual fault tolerant stripe associated with the first host data. Accordingly, processing logic can determine, based on the redundancy factor, that redundancy metadata associated with the second host data is to be stored at the same set of memory cells that store the redundancy metadata associated with the first host data (e.g., the third set of memory cells).

At block 616, processing logic can generate redundancy metadata associated with the first host data and the second host data. In some embodiments, processing logic can obtain the first host data from the first set of memory cells and execute a redundancy metadata operation based on the first host data and the second host data. For example, processing logic can execute an XOR operation based on the first host data and the second host data to generate redundancy metadata associated with the first host data and the second host data. At block 618, processing logic can program the generated redundancy metadata to the third set of memory cells. In some embodiments, the third set of memory cells can store redundancy metadata associated with the first host data, as described above. Processing logic can replace the redundancy metadata associated with the first host data at the third set of memory cells with the redundancy metadata associated with the first host data and the second host data (i.e., generated at block 616).

Figure 3C:
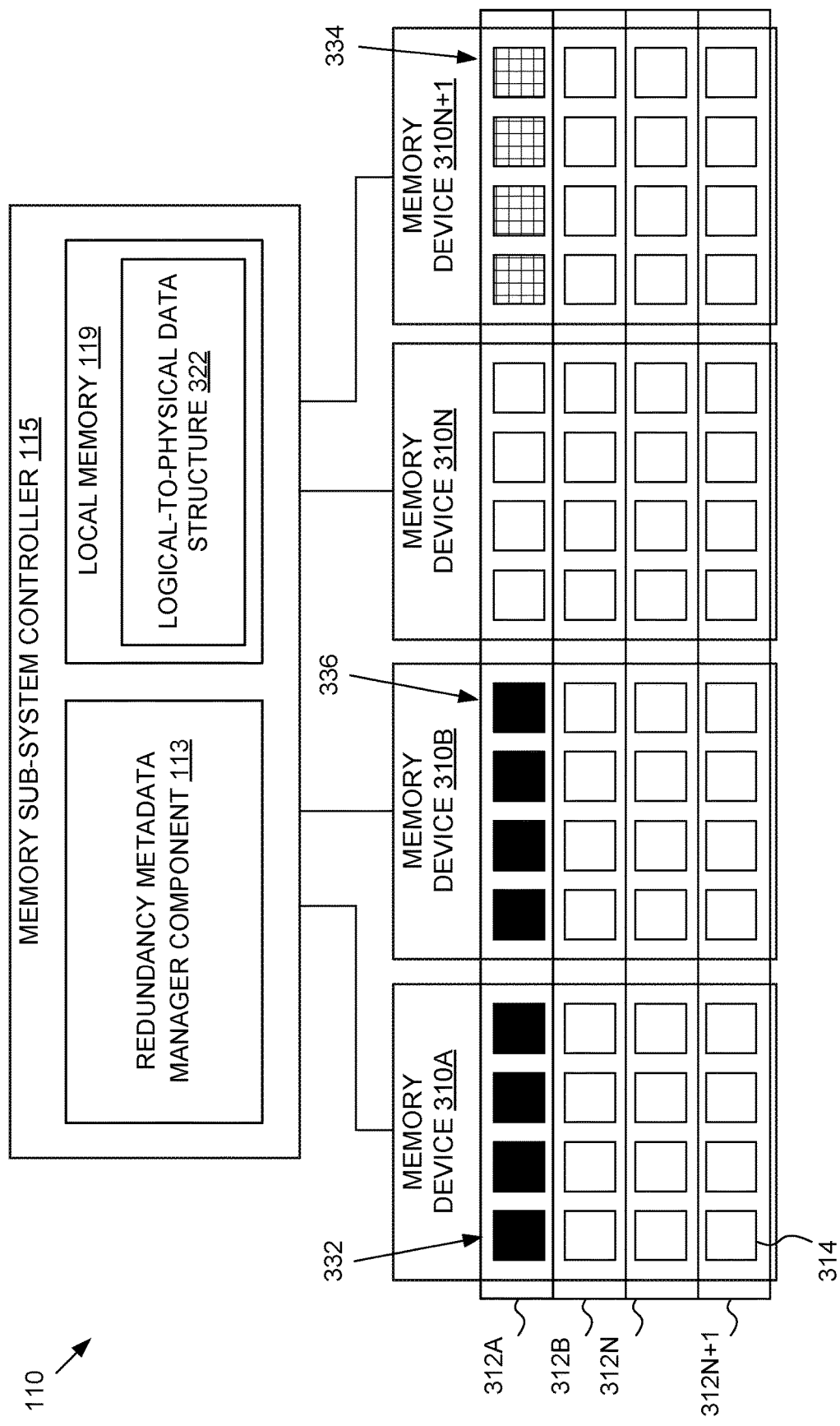

FIG. 3C depicts first host data, second host data, and redundancy metadata associated with the first and second host data programmed to memory cells associated with a respective fault tolerant stripe 312 (e.g., stripe 312A), in accordance with some embodiments of the present disclosure. As illustrated in FIG. 3C, first host data can be programmed to a set of memory cells 332 corresponding to one or more first MUs of a first fault tolerant stripe 312A, as described above. As also illustrated in FIG. 3C, second host data can be programmed to a set of memory cells 336 corresponding to one or more second MUs of first fault tolerant stripe 312A. Before the second request to program the second host data to memory sub-system 110, memory cells 334 can store redundancy metadata associated with the first host data (i.e., as illustrated in FIG. 3B). After (or before) the second host data is programmed to memory cells 336, redundancy metadata manager 113 can generated updated redundancy metadata that includes redundancy metadata associated with the first host data and the second host data, as described above. Redundancy metadata manager 113 can program the updated redundancy metadata to memory cells 334, as illustrated in FIG. 3C.

In some embodiments, memory sub-system controller 115 can program host data to memory cells associated with each host data MU of a respective fault tolerant stripe, in accordance with embodiments described herein. As host data is programmed to memory cells associated with the respective fault tolerant stripe, redundancy metadata manager 113 can update redundancy metadata associated with the fault tolerant stripe and can store the updated redundancy metadata at the set of memory cells of the fault tolerant stripe that is allocated to store redundancy metadata, in accordance with embodiments provided herein. After each host data MU of the fault tolerant stripe stores host data (i.e., no memory cells of the fault tolerant stripe are available to store host data), memory sub-system controller 115 can "close" the fault tolerant stripe and "open" another fault tolerant stripe to store incoming host data. In response to receiving a request to store host data to the memory sub-system 110, redundancy metadata manager 113 can obtain a redundancy factor corresponding to a logical address of the host data, as described above. As the host data is to be stored at memory cells of the newly opened fault tolerant stripe, the redundancy factor corresponding to the logical address can be different from the redundancy factor corresponding to the logical addresses associated with host data programmed to the "closed" fault tolerant stripe. Accordingly, redundancy metadata manager 113 can identify a different set of memory cells (e.g., at a different memory device 310 or a different portion of memory device 310) that is to store host data associated with the incoming host data.

Figure 3D:
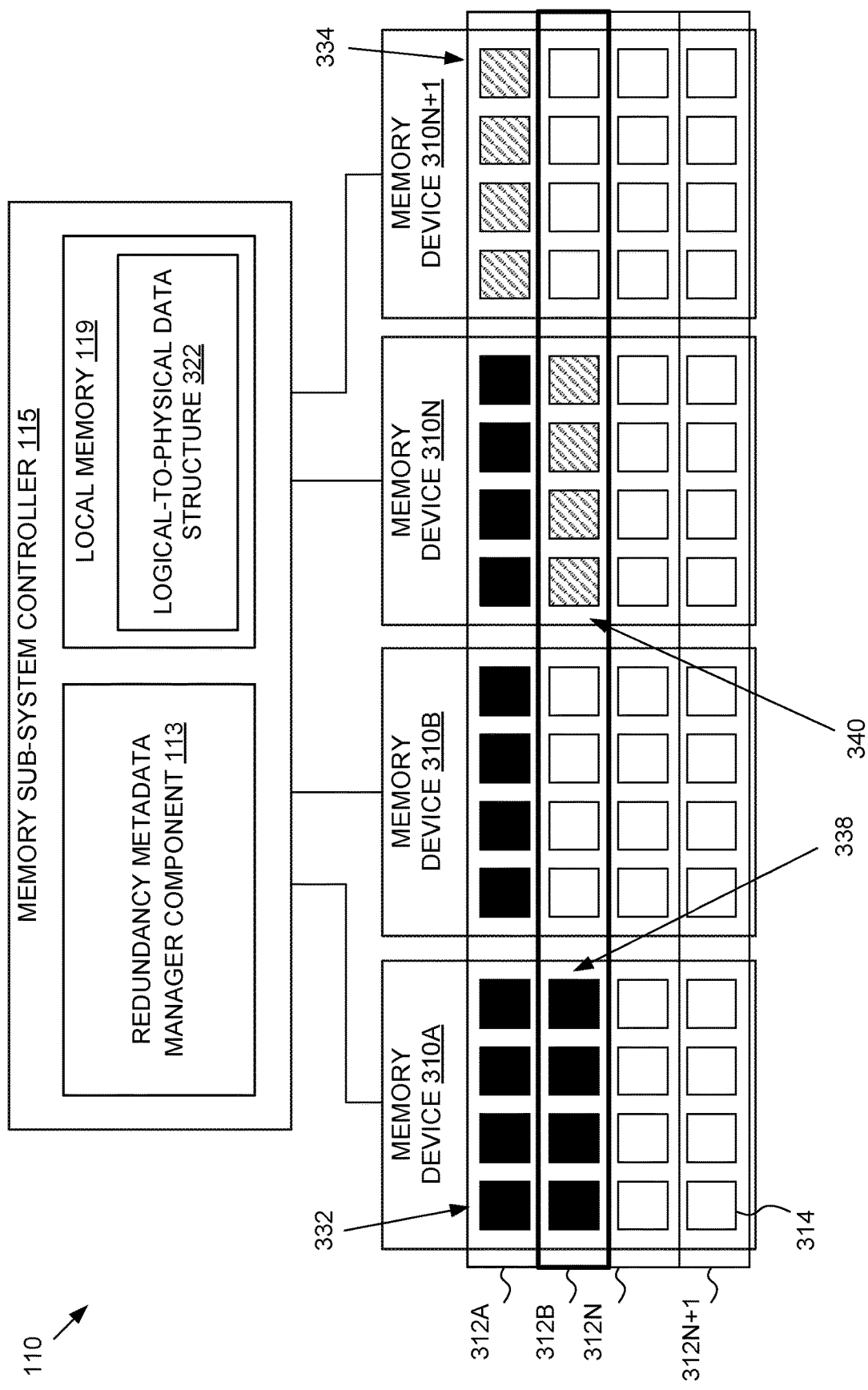

FIG. 3D depicts additional host data programmed to memory cells associated with a different fault tolerant stripe (e.g., stripe 312B), in accordance with embodiments of the present disclosure. As illustrated in FIG. 3D, memory sub-system controller 115 can program host data received after stripe 312A is closed at memory cells 338. Redundancy metadata manager 113 can determine, based on a logical address associated with the host data, that redundancy data associated with the host data is to be stored at memory cells 340. As illustrated in FIG. 3D, memory cells 340 can reside at a different memory device (e.g., memory device 310N) than the memory device that includes memory cells 334, which are configured to store redundancy metadata for stripe 312A.

Figure 7:
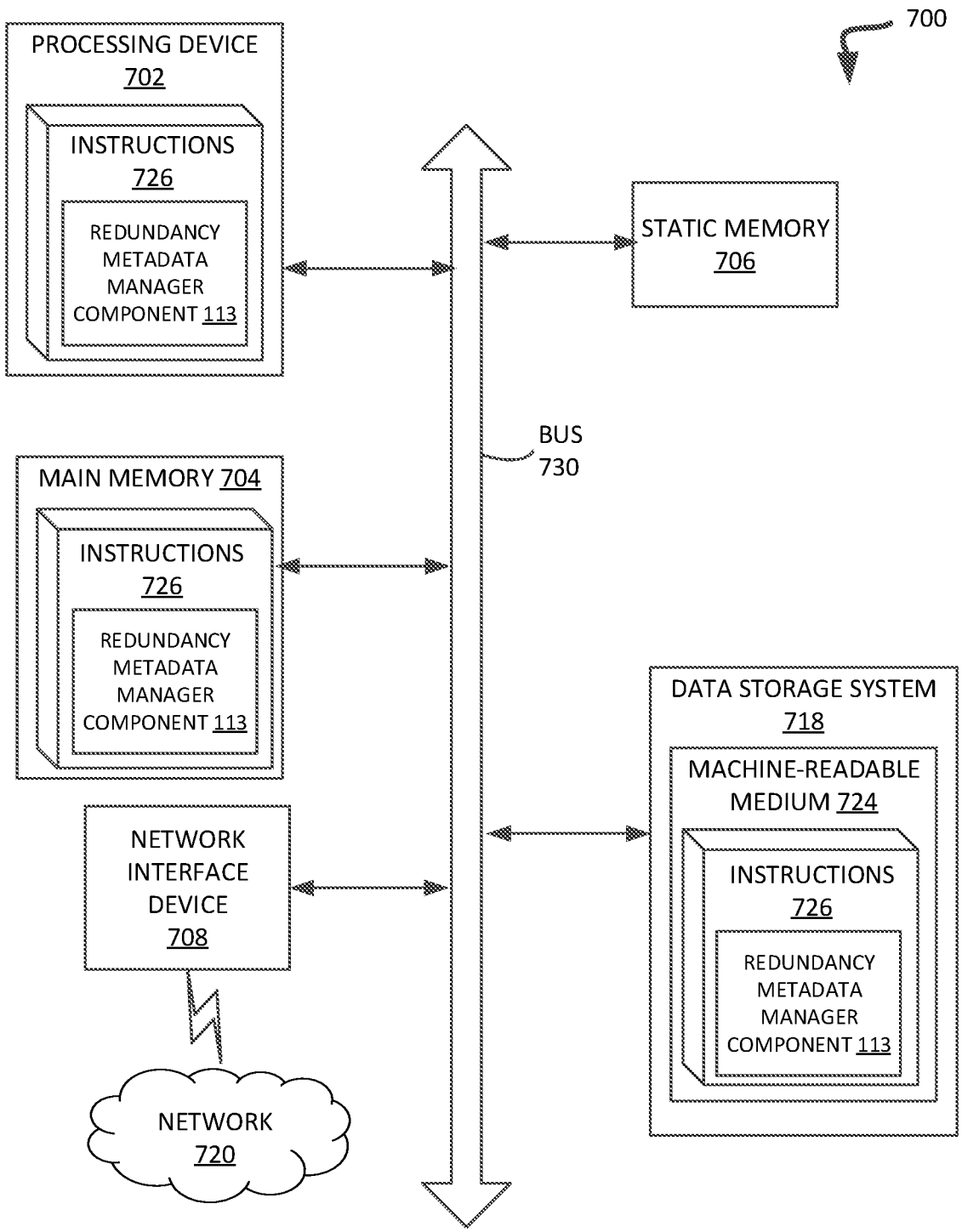
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the redundancy metadata manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 618, and/or main memory 704 can correspond to the memory sub-system 110 of FIG. 1.

In one embodiment, the instructions 726 include instructions to implement functionality corresponding to a voltage bin boundary component (e.g., the redundancy metadata manager component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a request to program host data to a memory device of a memory sub-system, wherein the host data is associated with a logical address;
   obtaining a redundancy factor that corresponds to the logical address associated with the host data;
   determining, based on the redundancy factor, a first physical address associated with a first set of cells of the memory device and a second physical address associated with a second set of cells of the memory device, wherein the first set of memory cells is to store the host data and the second set of memory cells is to store redundancy metadata associated with the host data;
   programming the host data to the first set of memory cells; and
   programming the redundancy metadata associated with the host data to the second set of memory cells.

2. The method of claim 1, wherein obtaining the redundancy factor comprises:
   determining, based on the logical address, a virtual super management unit (vSMU) associated with the host data;
   identifying an entry of a logical-to-physical (L2P) data structure that corresponds to the determined vSMU;
   responsive to determining that the identified entry does not comprise an indication of the redundancy factor, generating the redundancy factor; and
   updating the identified entry to include an indication of the generated redundancy factor.

3. The method of claim 2, wherein generating the redundancy factor comprises:
   determining a number of super management units (SMUs) associated with the memory sub-system; and
   determining a random number between zero and the determined number of SMUs, wherein the redundancy factor corresponds to the determined random number.

4. The method of claim 2, further comprising:
   responsive to determining that the identified entry comprises an indication of the redundancy factor, extracting the redundancy factor from the identified entry.

5. The method of claim 1, wherein determining the first physical address comprises:
   determining, based on the logical address, a virtual fault tolerant stripe associated with the host data and a virtual management unit (vMU) associated with the host data
   providing an indication of the virtual fault tolerant stripe and the redundancy factor as input to a first function and an indication of the vMU and the redundancy factor as input to a second function; and
   obtaining a first output of the first function and a second output of the second function, wherein the first output comprises an indication of a fault tolerant stripe associated with the memory device and the second output comprises an indication of a management unit (MU) associated with the memory device,
   wherein the first physical address corresponds to the fault tolerant stripe and the MU associated with the memory device.

6. The method of claim 5, wherein the second physical address is further determined based on an index corresponding to the virtual fault tolerant stripe, a number of management units associated with the fault tolerant stripe, a number of memory devices associated with the memory sub-system, and a number of partitions associated with each memory device associated with the memory sub-system.

7. The method of claim 1, wherein the first set of memory cells and the second set of memory cells are associated with a particular fault tolerant stripe associated with the memory device, and wherein the method further comprises:
   generating the redundancy metadata associated with the host data based on the host data and additional host data programmed to a third set of memory cells associated with the particular fault tolerant stripe.

8. A system comprising:
   a memory device comprising a plurality of fault tolerant stripes, wherein each of the plurality of fault tolerant stripes comprise one or more sets of memory cells; and
   a processing device coupled to the memory device, the processing device to perform operations comprising:
      receiving a first request to program first host data to the memory device, wherein the first host data is associated with a first logical address that corresponds to a first set of memory cells of a fault tolerant stripe of the plurality of fault tolerant stripes;
      receiving a second request to program second host data to the memory device, wherein the second host data is associated with a second logical address that corresponds to a second set of memory cells of the fault tolerant stripe;
      determining, based on a redundancy factor that corresponds to the first logical address and the second logical address, that redundancy metadata associated with the first host data and the second host data is to be stored at a third set of memory cells of the fault tolerant stripe;
      generating redundancy metadata associated with the first host data and the second host data; and
      programming the generated redundancy metadata to the second set of memory cells.

9. The system of claim 8, wherein the operations further comprise:
   determining, based on the first logical address, a virtual fault tolerant stripe associated with the first host data and a virtual management unit (vMU) associated with the host data;
   providing an indication of the virtual fault tolerant stripe and the redundancy factor as input to a first function and an indication of the vMU and the redundancy factor as input to a second function; and
   obtaining a first output of the first function and a second output of the second function, wherein the first output comprises an indication of the fault tolerant stripe and the second output comprises an indication of a management unit (MU) of the fault tolerant stripe;

determining, based on the indication of the fault tolerant stripe and the indication of the MU, a first physical address associated with the first set of memory cells.

10. The system of claim 8, further comprising:
determining, based on the first logical address, a virtual super management unit (vSMU) associated with the first host data;
identifying an entry of a logical-to-physical (L2P) data structure that corresponds to the determined vSMU;
responsive to determining that the identified entry comprises an indication of the redundancy factor associated with the fault tolerant stripe, extracting the redundancy factor from the identified entry; and
responsive to determining that the identified entry does not comprise an indication of the redundancy factor:
generating the redundancy factor; and
updating the identified entry to include an indication of the redundancy factor.

11. The system of claim 10, wherein determining that the redundancy metadata associated with the first host data and the second host data is to be stored at the third set of memory cells comprises:
determining a physical address associated with the third set of memory cells based on the redundancy factor, an index corresponding to a virtual fault tolerant stripe associated with the first host data, a number of MUs associated with the fault tolerant stripe, a number of memory devices of the system, and a number of partitions associated with each memory device associated with the system.

12. The system of claim 11, wherein the operations further comprise:
determining, based on the second logical address, that the second host data is associated with the vSMU that is associated with the host data;
identifying the entry of the L2P data structure that corresponds to the vSMU;
extracting the redundancy factor from the identified entry; and
determining the physical address associated with the third set of cells.

13. The system of claim 8, wherein the operations further comprise:
programming the first host data to the first set of memory cells; and
programming the second host data to the second set of memory cells.

14. A non-transitory computer-readable storage medium comprising instructions that, when executed by a processing device, cause the processing device to perform operations comprising:
receiving a request to program host data to a memory device of a memory sub-system, wherein the host data is associated with a logical address;
obtaining a redundancy factor that corresponds to the logical address associated with the host data;
determining, based on the redundancy factor, a first physical address associated with a first set of cells of the memory device and a second physical address associated with a second set of cells of the memory device, wherein the first set of memory cells is to store the host data and the second set of memory cells is to store redundancy metadata associated with the host data;
programming the host data to the first set of memory cells; and
programming the redundancy metadata associated with the host data to the second set of memory cells.

15. The non-transitory computer-readable storage medium of claim 14, wherein obtaining the redundancy factor comprises:
determining, based on the logical address, a virtual super management unit (vSMU) associated with the host data;
identifying an entry of a logical-to-physical (L2P) table that corresponds to the determined vSMU;
responsive to determining that the identified entry does not comprise an indication of the redundancy factor, generating the redundancy factor; and
updating the identified entry to include an indication of the generated redundancy factor.

16. The non-transitory computer-readable storage medium of claim 15, wherein generating the redundancy factor comprises:
determining a number of super management units (SMUs) associated with the memory sub-system; and
determining a random number between zero and the determined number of SMUs, wherein the redundancy factor corresponds to the determined random number.

17. The non-transitory computer-readable storage medium of claim 15, wherein the operations further comprise:
responsive to determining that the identified entry comprises an indication of the redundancy factor, extracting the redundancy factor from the identified entry.

18. The non-transitory computer-readable storage medium of claim 14, wherein determining the first physical address comprises:
determining, based on the logical address, a virtual fault tolerant stripe associated with the host data and a virtual management unit (vMU) associated with the host data
providing an indication of the virtual fault tolerant stripe and the redundancy factor as input to a first function and an indication of the vMU and the redundancy factor as input to a second function; and
obtaining a first output of the first function and a second output of the second function, wherein the first output comprises an indication of a fault tolerant stripe associated with the memory device and the second output comprises an indication of a management unit (MU) associated with the memory device,
wherein the first physical address corresponds to the fault tolerant stripe and the MU associated with the memory device.

19. The non-transitory computer-readable storage medium of claim 18, wherein the second physical address is further determined based on an index corresponding to the virtual fault tolerant stripe, a number of management units associated with the fault tolerant stripe, a number of memory devices associated with the memory sub-system, and a number of partitions associated with each memory device associated with the memory sub-system.

20. The non-transitory computer-readable storage medium of claim 14, wherein the first set of memory cells and the second set of memory cells are associated with a particular fault tolerant stripe associated with the memory device, and wherein the operations further comprise:
generating the redundancy metadata associated with the host data based on the host data and additional host data programmed to a third set of memory cells associated with the particular fault tolerant stripe.

* * * * *